Oct. 25, 1955  S. MORA  2,721,346
COMBINED SCRAPER AND SQUEEGEE
Filed June 24, 1953
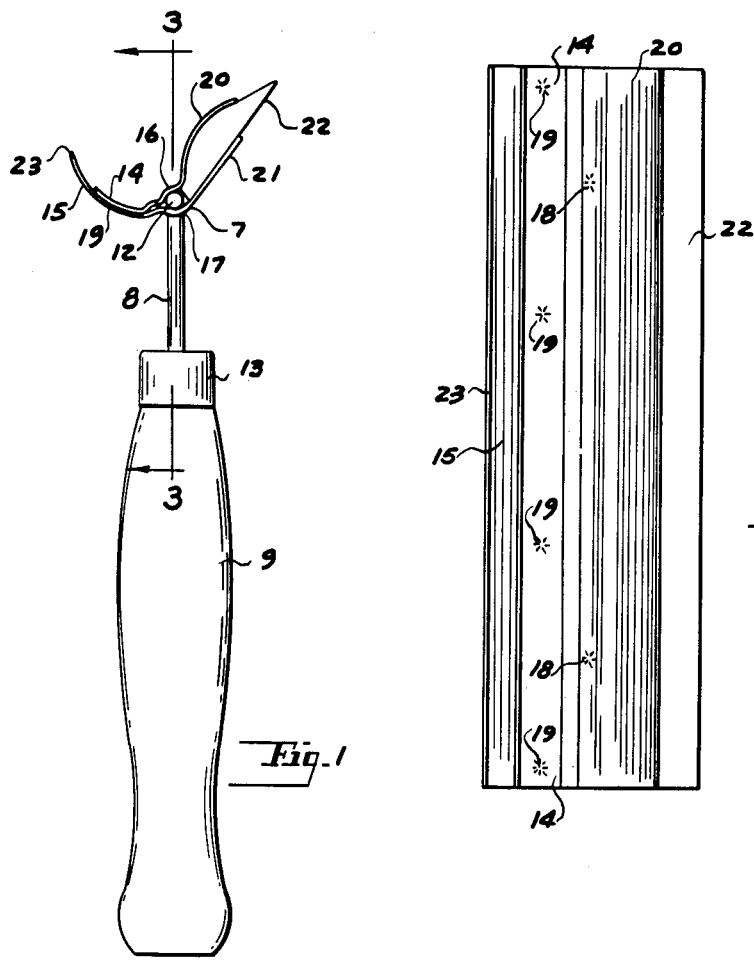
Fig. 1
Fig. 2
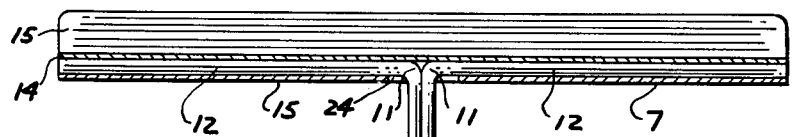
Fig. 3
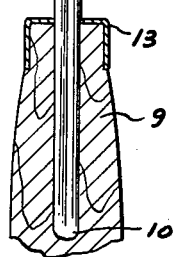
INVENTOR.
STEVE MORA.
BY Edward M. Apple
ATTORNEY.

United States Patent Office 2,721,346
Patented Oct. 25, 1955

2,721,346

COMBINED SCRAPER AND SQUEEGEE

Steve Mora, Detroit, Mich., assignor to Inter-City Manufacturing Company, Detroit, Mich., a copartnership Application June 24, 1953, Serial No. 363,763

3 Claims. (Cl. 15—105)

This invention relates ot window cleaning devices, and has particular reference to a device for scraping snow and ice from the windshield of a motor vehicle and the like.

An object of the invention is to generally improve devices of the character indicated, and to provide a scraper and squeegee which is simple in construction, economical to manufacture, and efficient in use.

Another object of the invention is to provide a device of the character indicated, which may be constructed with comparatively light gage metal, yet be sufficiently rigid to enable it to be used to scrape off any thickness of ice from the windshield.

The foregoing and other objects and advantages of the invention will become more apparent as the description proceeds, reference being made from time to time to the accompanying drawing forming part of the within disclosure, in which drawing:

Fig. 1 is a side elevational view of the device embodying the invention.

Fig. 2 is a top plan view of the device illustrated in Fig. 1.

Fig. 3 is a section taken substantially on the line 3—3 of Fig. 1.

Referring now more particularly to the drawing, it will be understood that in the embodiment herein disclosed, the reference character 7 generally indicates the head, the reference character 8 indicates the shank, and the reference character 9 indicates the handle of the device. The shank 8 is formed of a single length of wire that is bent, as at 10, intermediate its ends and is rebent, as at 11, to form a pair of oppositely directed legs 12. The bent portion 10 of the shank is inserted into a suitable bore formed in the handle 9 and the end of the handle is protected by a ferrule 13 as in conventional practice.

The head 7 consists of a pair of metal plates 14 and 15 which are bent and rebent, as shown in Fig. 1. The plates 14 and 15 are provided with longitudinal grooves 16 and 17, which are arranged to receive the leg portions 12. The plates 14 and 15 are spot welded to the leg portions 12, as at 18, and the plates 14 and 15 are spot welded to each other, as at 19. It will be noted that the plate member 14 is provided with a curved portion 20 and the plate 15 is provided with a straight portion 21, which is spaced from the curved portion 20 to provide an opening for the insertion therein of a rubber squeegee blade 22.

It will also be noted that the curved portion 20 of the plate 14 somewhat over-hangs the straight portion of the plate 15, so that the rubber squeegee 22 is greatly reinforced and given a rigid backing when the device is being used.

It will also be noted that the plate 14 terminates short of the edge 23 of the plate 15. This reinforces the plate 15 so that the longitudinal edge 23 may be maintained in a sharp condition for better scraping of solid ice from the windshield.

It will be noted also that the plate 15 (Fig. 3) is provided with a substantially central opening 24 for the extension there-through of the shank 8, which permits the leg portions 12 to lie in the grooves 16 and 17 between the respective plates 14 and 15.

It is believed that the operation of the device is obvious from the foregoing.

Having described my invention, what I claim and desire to secure by Letters Patent is:

1. A device of the character described, comprising in combination a handle, a shank received in said handle, and a head carried by said shank, said head comprising a pair of thin rectangular members secured together along a corresponding edge of each member by spot welding, and supported along their opposite edges in spaced relation, said members being secured to said shank by spot welding, one of said members being provided with a central opening for receiving said shank, said shank having a pair of oppositely directed legs interposed between said members and secured by welding to said members.

2. A device of the character described, comprising in combination a handle, a shank received in said handle, and a head carried by said shank, said head comprising a pair of thin rectangular members secured together along a corresponding edge of each member by spot welding, and supported along their opposite edges in spaced relation, said members being secured to said shank by spot welding, one of said members being provided with a central opening for receiving said shank, said shank having a pair of oppositely directed legs interposed between said members and secured by welding to said members, each of said members having an intermediate curved portion, which together form a channel for receiving the legs of said shank, and one of said members having a curved portion along the edge remote from said first named edge and the other of said members having a straight portion adjacent thereto, there being a flexible blade secured between said last named curved portion and said straight portion of said members.

3. A device of the character described, comprising in combination a handle, a shank received in said handle, and a head carried by said shank, said head comprising a pair of thin rectangular members secured together along a corresponding edge of each member by spot welding, and supported along their opposite edges in spaced relation, said members being secured to said shank by spot welding, one of said members being provided with a central opening for receiving said shank, said shank having a pair of oppositely directed legs interposed between said members and secured by welding to said members, each of said members having an intermediate curved portion, which together form a channel for receiving the legs of said shank.

References Cited in the file of this patent

UNITED STATES PATENTS

| 585,346 | Stewart | June 29, 1897 |
| 1,628,783 | Jensen | May 17, 1927 |